United States Patent
Nguyen et al.

(10) Patent No.: US 11,507,130 B2
(45) Date of Patent: Nov. 22, 2022

(54) DISTRIBUTING A GLOBAL COUNTER VALUE IN A MULTI-SOCKET SYSTEM-ON-CHIP COMPLEX

(71) Applicant: Ampere Computing LLC, Santa Clara, CA (US)

(72) Inventors: Kha Hong Nguyen, Santa Clara, CA (US); Brian Thomas Chase, Santa Clara, CA (US); Sean Philip Mirkes, Santa Clara, CA (US); Phil Mitchell, San Jose, CA (US); Graham B. Whitted, III, Irvine, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/166,505

(22) Filed: Feb. 3, 2021

(65) Prior Publication Data
US 2022/0244756 A1 Aug. 4, 2022

(51) Int. Cl.
*G06F 1/12* (2006.01)
*G06F 15/78* (2006.01)
*G06F 1/24* (2006.01)

(52) U.S. Cl.
CPC .................. *G06F 1/12* (2013.01); *G06F 1/24* (2013.01); *G06F 15/7807* (2013.01)

(58) Field of Classification Search
CPC ........... G06F 1/12; G06F 1/24; G06F 15/7807
See application file for complete search history.

(56) References Cited

U.S. PATENT DOCUMENTS

| | | | | |
|---|---|---|---|---|
| 5,995,751 | A * | 11/1999 | Kosugi | G06F 15/8053 712/E9.034 |
| 2010/0138640 | A1* | 6/2010 | Gilday | G06F 1/24 713/1 |
| 2011/0119521 | A1* | 5/2011 | Bellofatto | G06F 1/10 713/503 |
| 2021/0406207 | A1* | 12/2021 | Narala | G06F 13/372 |

* cited by examiner

*Primary Examiner* — Zahid Choudhury
(74) *Attorney, Agent, or Firm* — Withrow & Terranova, PLLC (57) ABSTRACT

Apparatuses, systems, and methods for distributing a global counter value in a multi-socket SoC complex. In exemplary aspects, an apparatus comprises a first system-on-a-chip (SoC) in a first socket and a second SoC in a second socket. The apparatus further comprises a reset circuit coupled to the first SoC and the second SoC, a reset synchronization circuit coupled to the reset circuit, the first SoC, and the second SoC, and a global counter clock signal coupled to the reset synchronization circuit, the first SoC, and the second SoC. The reset synchronization circuit is configured to generate a global counter reset signal in response to a reset signal received from the reset circuit and to distribute the global counter reset signal to the first SoC and the second SoC substantially simultaneously.

20 Claims, 4 Drawing Sheets

DISTRIBUTING A GLOBAL COUNTER VALUE IN A MULTI-SOCKET SYSTEM-ON-CHIP COMPLEX

BACKGROUND

I. Field of the Disclosure

The technology of the disclosure relates generally to distributing a global counter in a computing system, and specifically to the synchronizing and distributing a global counter value across a multi-socket system-on-chip (SoC) complex.

II. Background

In order for events and operations to be synchronized across a multi-socket system-on-chip (SoC) complex, some common point of time reference may be established between the SoCs occupying the multiple sockets. The same is true for individual portions of a single SoC of the multi-socket complex, especially where a single SoC may be relatively physical large. As both the individual SoC dies, and the overall multi-socket complex increase in size, the problem of distributing a common signal such as a global counter value for example, may increase in complexity. This complexity increases for an increasing number of endpoints that will require balancing, in order for all of the endpoints to observe the common signal at substantially the same time.

In conventional synchronous implementations of distribution of a common signal, such as a global counter value, in a computing system, the global counter value may achieve this balance by distributing the global counter value across many clock cycles, and may employ relatively complex synchronization methods. In turn, this may both increase the relative cost of distributing the global counter value, and may reduce the frequency at which an associated global counter clock (which may be used in generating the global counter value) can be run, which may lead to undesirable trade-offs regarding the performance of the multi-socket SoC complex. There may be additional trade-offs involved in intra-socket distribution of a global counter value within each socket of the multi-socket SoC complex, as conventional implementations may relax the timing requirements (and thus, may reduce clock frequency) in distributing the global counter value inside a socket to account for variation between the SoCs, which may also lead to reduced performance.

Thus, a computing system to distribute a global counter value to multiple sockets of an SoC complex, without incurring the overhead penalty involved in conventional synchronous designs and maintaining a relatively faster global counter clock frequency, while providing the ability to individually adjust the timing of the intra-socket distribution of the global counter value, may be desirable.

SUMMARY OF THE DISCLOSURE

Aspects disclosed in the detailed description include an apparatus for distributing a global counter value in a multi-socket SoC complex. Related methods and systems are also disclosed.

In this regard in one aspect, an apparatus comprises a first SoC in a first socket and a second SoC in a second socket. The apparatus further comprises a reset circuit coupled to the first SoC and the second SoC, a reset synchronization circuit coupled to the reset circuit, the first SoC, and the second SoC, and a global counter clock signal coupled to the reset synchronization circuit, the first SoC, and the second SoC. The reset synchronization circuit is configured to generate a global counter reset signal in response to a reset signal received from the reset circuit and to distribute the global counter reset signal to the first SoC and the second SoC substantially simultaneously.

In this regard in another aspect, an apparatus comprises first means for processing in a first means for mounting and second means for processing in a second means for mounting. The apparatus further comprises means for resetting coupled to the first means for processing and the second means for processing, means for reset synchronization coupled to the means for resetting, the first means for processing, and the second means for processing, and means for global counter clocking coupled to the means for reset synchronization, the first means for processing, and the second means for processing. The means for reset synchronization is configured to generate a global counter reset signal in response to a reset signal received from the means for resetting and to distribute the global counter reset signal to the first means for processing and the second means for processing substantially simultaneously.

In this regard in yet another aspect, a method comprises receiving a system reset at a first SoC in a first socket, a second SoC in a second socket, and a reset synchronization circuit. The method further comprises generating a global counter reset signal at the reset synchronization circuit. The method further comprises providing the global counter reset signal to the first SoC in the first socket and the second SoC in the second socket substantially simultaneously.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
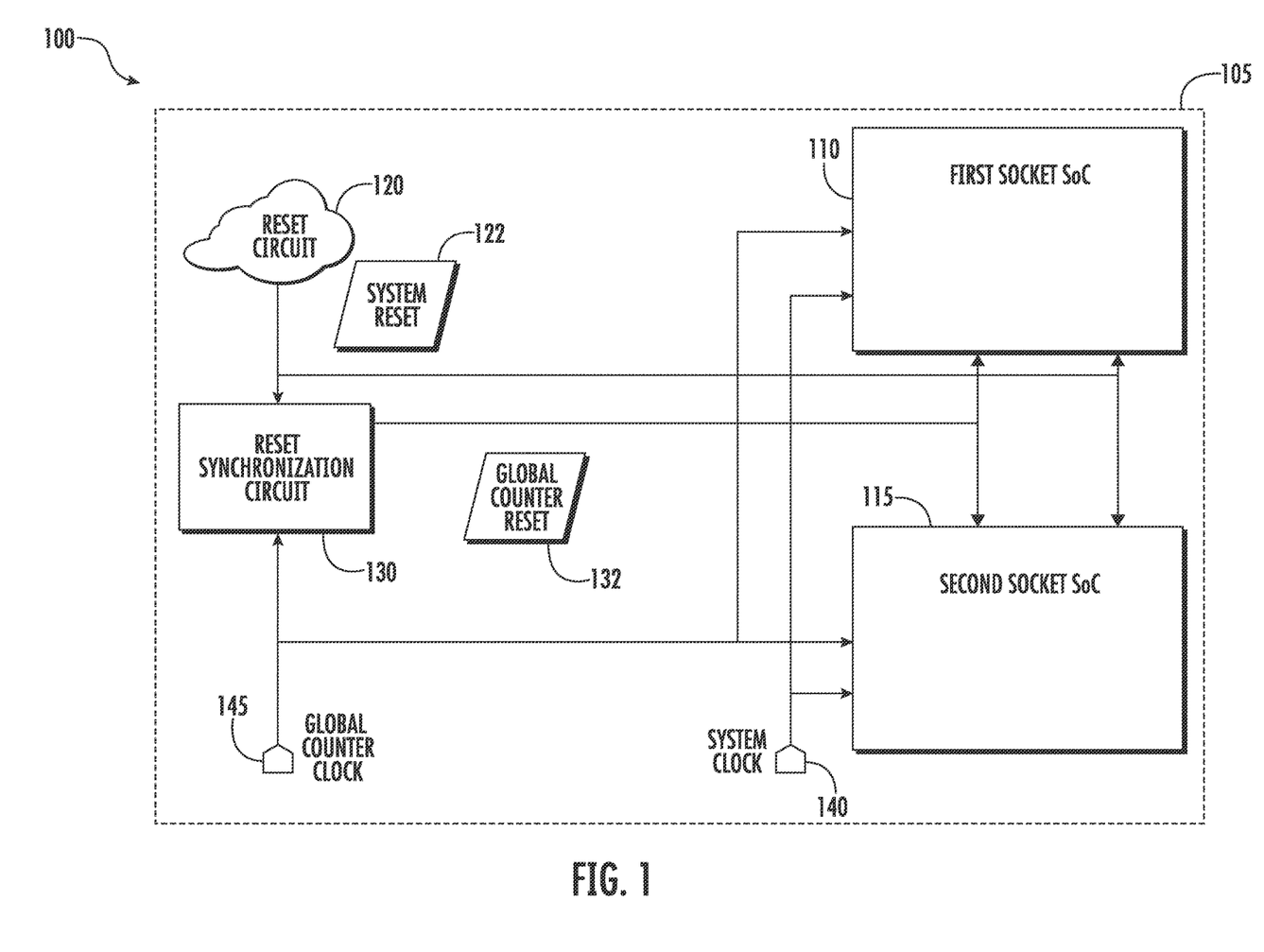
FIG. 1 is a block diagram of a system for distributing a global counter value to multiple SoCs occupying multiple sockets of a multi-socket complex according to one aspect.

In this regard, FIG. 1 is a block diagram of a system 100 for distributing a global counter value to multiple systems-on-chip (SoCs) occupying multiple sockets of a multi-socket complex 105. With respect to the present disclosure, an SoC is an integrated circuit that integrates a number of components or functions of a computer or other electronic system onto a single chip, and may conventionally include microprocessors, as well as other types of integrated circuit known to those having skill in the art. The multi-socket complex 105 includes a first socket SoC 110 (which may be referred to as the "first SoC") and a second socket SoC 115 (which may be referred to as the "second SoC") in this example. In one aspect, the first socket SoC 110 and the second socket SoC 115 may be processors. The first socket SoC 110 and the second socket SoC may further be coupled to a reset circuit 120 and a reset synchronization circuit 130. A system clock 140 may be coupled to each of the first socket SoC 110 and the second socket SoC 115 to allow local clock signals of each SoC to be generated and/or synchronized. A global counter clock 145 may be coupled to each of the first socket SoC 110, the second socket SoC 115, and the reset synchronization circuit 130, and may be used as described further herein to generate a synchronized global counter value which may be distributed in each of the first socket SoC 110 and the second socket SoC 115.

The reset circuit 120 may generate a system reset signal 122 in response to an event in the multi-socket complex 105. This event may be pressing a power or reset button, triggering a software reset, or other event which is intended to cause the multi-socket complex 105 to perform a reset. The system reset signal 122 is distributed to the reset synchronization circuit 130, and to each of the first socket SoC 110 and the second socket SoC 115.

The first socket SoC 110 and the second socket SoC 115 may perform actions related to the reset (resetting registers to an initial state based on a firmware configuration, etc.) for which synchronization between the first socket SoC 110 and the second socket SoC 115 is not essential. However, as will be described in more detail with respect to FIG. 2, it may be desirable that a global counter value for each of the first socket SoC 110 and the second socket SoC 115 be reset substantially simultaneously, so that a common base time value will exist across all sockets. In examples disclosed herein, to accomplish this, the reset synchronization circuit 130 combines the asynchronous system reset signal 122 with the global counter clock 145 to generate a synchronous global counter reset signal 132. In one aspect, only the deassertion of the synchronous global counter reset signal 132 may be synchronized with the global counter clock 145, while the assertion of the synchronous global counter reset signal 132 may be asynchronous. The global counter reset signal 132 is routed from the reset synchronization to each of the first socket SoC 110 and the second socket SoC 115 such that the global counter reset signal 132 arrives at each socket at substantially the same time. This may be accomplished, in one aspect, by ensuring that the physical distance that the global counter reset signal 132 travels (e.g., on a motherboard or other surface or platform on which the first socket SoC 110 and the second socket SoC 115 are mounted by a socket or similar mounting device) from the reset synchronization circuit 130 to each of its endpoints the first socket SoC 110 and the second socket SoC 115 in the illustrated aspect) is substantially similar, that both paths have similar loading, and that other physical constraints known to those having skill in the art are kept as similar as possible. To provide adequate synchronization between the global counter value for the first socket SoC 110 and the second socket SoC 115, a skew between the respective arrival times of the each of global counter reset signal 132 and the global counter clock 145 at each of the first socket SoC 110 and the second socket SoC 115 should be kept as tight as is practically possible with respect to the clock period of the global counter clock 145, given the physical constraints described above that are imposed by the distribution of the global counter reset signal 132 and the global counter clock 145 to multiple SoCs in multiple sockets. The above-described parameters may be chosen to ensure that there is no discrepancy in the respective global counter value as tracked by the first socket SoC 110 and the second socket SoC 115, which may mean "substantially simultaneously" for purposes of this disclosure. In one exemplary, non-limiting aspect, the skew is kept to less than 5% of the clock period of the global counter clock 145.

Upon receiving the asserted global counter reset signal 132, each of the first socket SoC 110 and the second socket SoC 115 sets their associated global counter value to a programmed initial value (e.g., a 64-bit representation of 0 in one aspect). Thereafter, once the global counter reset signal 132 has been de-asserted, each of the first socket SoC 110 and the second socket SoC 115 will update their associated global counter value based on a characteristic of the global counter clock 145. In one aspect, each of the first socket SoC 110 and the second socket SoC 115 will increment their associated global counter value by a programmed increment value at each rising edge of the global counter clock 145. Those having skill in the art will recognize that other characteristics of the global counter clock 145 and increment schemes are possible and are specifically within the scope of the teachings of the present disclosure.

Figure 2:
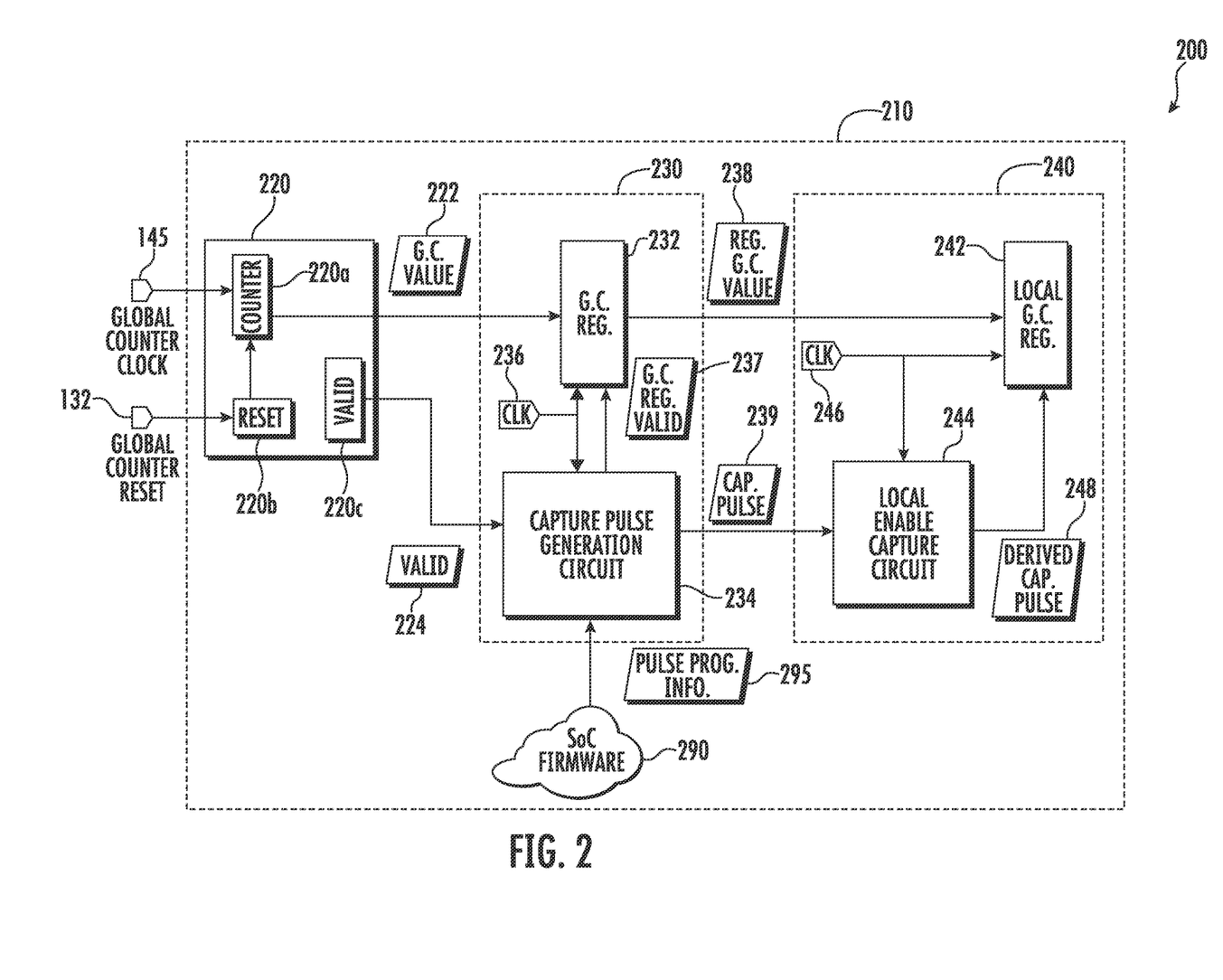
FIG. 2 is a block diagram illustrating the distribution of the global counter value within a single SoC of the multi-socket complex according to one aspect.

FIG. 2 is a block diagram illustrating a portion of a multi-socket complex 200 and the distribution of a global counter value within a single SoC 210 of the multi-socket complex 200, according to one aspect. The SoC 210 may correspond to the first socket SoC 110 or the second socket SoC 115 of FIG. 1, which is referenced as an example. In this regard, the SoC 210 receives the global counter reset signal 132 and the global counter clock 145 (as described with respect to FIG. 1) at a global counter generation circuit 220. The global counter generation circuit 220 includes a counter 220*a* storing a value which may be provided as a global counter value 222, which may be reset to a programmed initial value by a counter reset circuit 220*b* in response to the global counter reset signal 132, and which may be updated in response to a characteristic of the global counter clock 145 as described with respect to FIG. 1. The global counter generation circuit 220 further includes a valid signal circuit 220*c*, which generates a valid signal 224 that is asserted whenever there is a new valid global counter value 222 available for distribution. The global counter generation circuit 220 distributes the global counter value 222 and the valid signal 224 for use in the SoC 210 as will be described further herein.

The global counter value 222 and the valid signal 224 are distributed to a global counter distribution circuit 230, which includes a global counter register 232 and a capture pulse generation circuit 234. The global counter register 232 and the capture pulse generation circuit 234 may both be responsive to a first local clock signal 236. The global counter register 232 may capture the global counter value 222 based on a characteristic of the first local clock signal 236 and an associated global counter register valid signal 237, and may provide the registered global counter value 238 to other parts of the SoC 210. The capture pulse generation circuit 234 receives the valid signal 224 and the first local clock signal 236, and generates a capture pulse 239 based on the valid signal 224 and the first local clock signal 236. The characteristics of the capture pulse 239 may be controlled in part by SoC firmware 290, which may be programmed (e.g., from an external memory containing the firmware image) as part of an initial boot of the SoC 210, and which may be updated from time to time during operation. The SoC firmware 290 may provide pulse programming information 295 to the capture pulse generation circuit 234 which may control characteristics of the capture pulse 239 as described above, which may include controlling a delay of the capture pulse 239 with respect to the first local clock signal 236, a width of the capture pulse 239, or other parameters as will be clear to those having skill in the art. Providing the ability to control the parameters of the capture pulse 239 through the SoC firmware 290 may allow for increased performance of the SoC 210 by permitting the capture pulse 239 to be adjusted to match the manufacturing characteristics of the SoC 210, in one aspect; different adjustments may be applied to the firmware of different SoCs (such as the first socket SoC 110 and the second socket SoC 115 of FIG. 1).

The registered global counter value 238 and the capture pulse 239 are provided to a local portion 240 of the SoC 210. The local portion 240 may correspond to a cluster of processing cores of the SoC 210 in one aspect, and although a single local portion 240 is illustrated, those having skill in the art will appreciate that the registered global counter value 238 and the capture pulse 239 may be provided to many local portions 240 in parallel, and the described aspect is presented by way of illustration, and not by way of limitation. The local portion 240 includes a local global counter register 242 and a local enable capture circuit 244. The local global counter register 242 and the local enable capture circuit 244 may be responsive to a second local clock signal 246 (which in some aspects may be the same as the first local clock signal 236, while in other aspects may be distinct from the first local clock signal 236). The local enable capture circuit 244 may perform synchronization and edge detection of the capture pulse 239, and may further generate and provide a derived capture pulse 248 to the local global counter register 242, which may serve to enable the local global counter register 242 to capture the registered global counter value 238. The local global counter register 242 may capture the registered global counter value 238 based on the second local clock signal 246 and the derived capture pulse 248.

Those having skill in the art will appreciate that the aspects described with respect to FIG. 1 and FIG. 2 are for the purposes of illustration, and that other aspects are within the scope of the teachings of the present disclosure. Although the aspect illustrated in FIG. 1 has two sockets, those having skill in the art will recognize that as long as the timing constraints of the global counter reset signal 132 are maintained, the teachings of the present disclosure apply to aspects with any number of sockets, and to differing types of SoC populating the sockets (e.g., in a five-socket configuration, there may be four processing SoCs and one interconnect SoC, all of which may receive the global counter reset signal 132 as described with respect to FIG. 1).

With respect to the aspect of FIG. 2, where the global counter distribution circuit 230 and the local portion 240 are in different clock domains and may be operated at differing frequencies (i.e., the first local clock signal 236 and the second local clock signal 246 have different frequencies), signals that cross between the differing frequency domains may be translated across those domains by known techniques (such as asynchronous first-in-first-out circuits and the like), and in similar aspects, the various signals of FIG. 2 may traverse multiple frequency domains and may be translated accordingly without departing from the teachings of the present disclosure. Similarly, the various signals of FIG. 2 may likewise traverse multiple voltage domains, and may be translated to and from the voltage of the multiple domains according to known techniques.

Further, although the global counter distribution circuit 230 and the local portion 240 have been illustrated as having a one-to-one relationship in FIG. 2, the global counter distribution circuit 230 may be coupled to a plurality of local portions, and likewise, the SoC may have multiple global counter distribution circuits which may be coupled to differing numbers of local portions. Those having skill in the art will recognize that the number of global counter distribution circuits and the number of local portions associated with each global counter distribution circuit are matters of engineering design choice, and may be driven by a variety of factors including, but not limited to, physical size constraints, timing constraints, signal loading, and others which will occur to those having skill in the art.

Figure 3A:
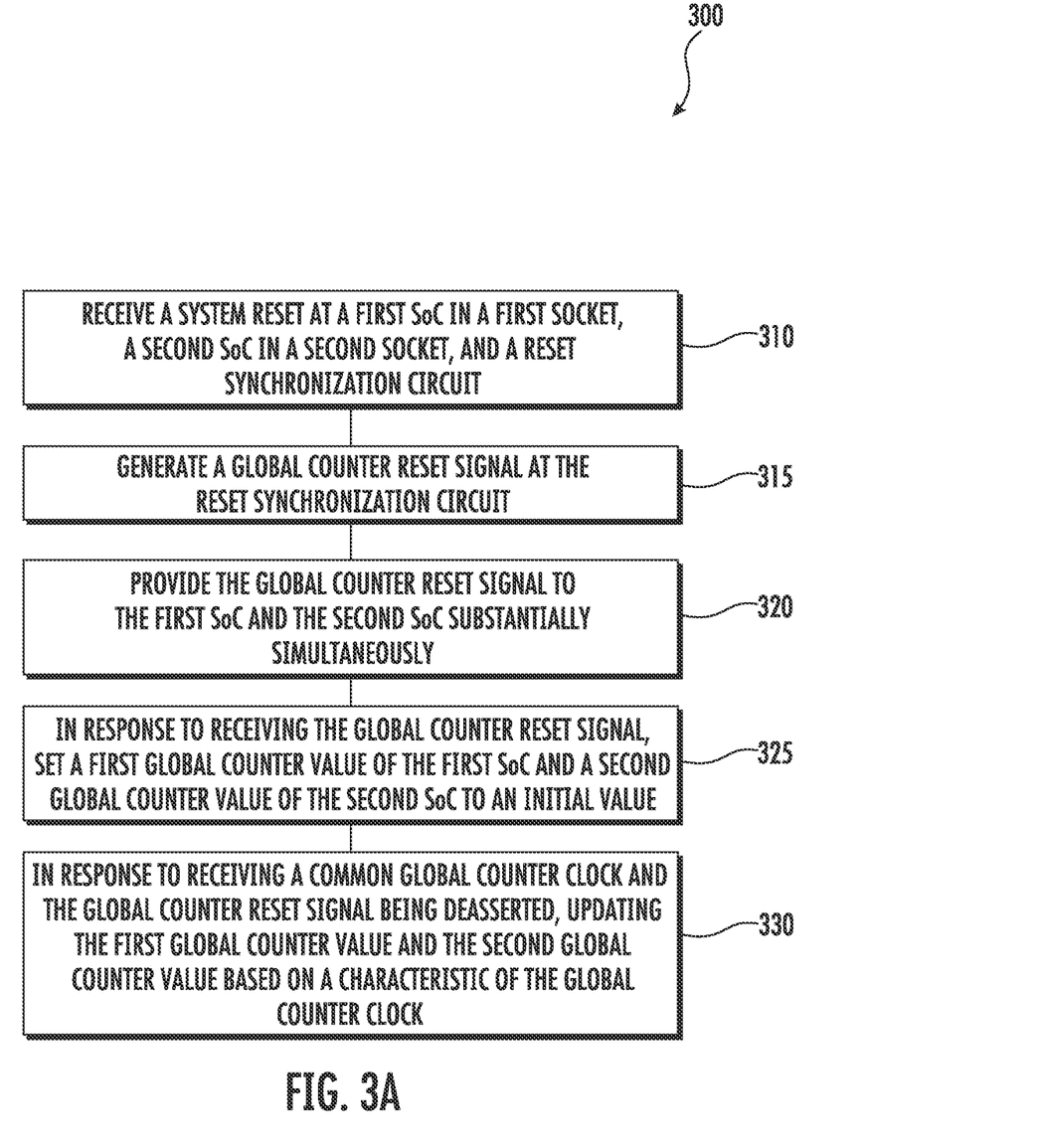
FIG. 3A is a block diagram of a method of distributing a global counter value to multiple SoCs occupying multiple sockets of a multi-socket complex according to one aspect.

FIG. 3A is a block diagram of a method 300 of distributing a global counter value to multiple SoCs occupying multiple sockets of a multi-socket complex according to one aspect. The method begins in block 310 by receiving a system reset at a first SoC in a first socket, a second SoC in a second socket, and a reset synchronization circuit. For example, as described with reference to FIG. 1, the system reset signal 122 is received by the reset synchronization circuit 130, the first socket SoC 110, and the second socket SoC 115.

The method continues in block 315 by generating a global counter reset signal at the reset synchronization circuit. For example, as described with reference to FIG. 1, the reset synchronization circuit combines the asynchronous system reset signal 122 with the global counter clock 145 to generate a synchronous global counter reset signal 132.

The method continues in block 320 by providing the global counter reset signal to the first SoC and the second SoC substantially simultaneously. For example, as described with reference to FIG. 1, the global counter reset signal 132 may observe specific timing constraints with respect to arrival at each of the first socket SoC 110 and the second socket SoC 115, such that the first socket SoC 110 and the second socket SoC 115 share a common base time value.

The method continues in block 325 by, in response to receiving the global counter reset signal, setting a first global counter value of the first SoC and a second global counter value of the second SoC to an initial value. For example, as described with reference to FIG. 1, a first global counter value of the first socket SoC 110 and a second global counter value of the second socket SoC 115 may be set to a programmed initial value, such as a 64-bit representation of zero.

The method may continue in block 330 by, in response to receiving a common global counter clock and the global counter reset signal being deasserted, updating the first global counter value and the second global counter value based on a characteristic of the global counter clock. For example, as described with reference to FIG. 1, once the global counter reset signal 132 has been deasserted, each of the first socket SoC 110 and the second socket SoC 115 will increment their associated global counter value by one at each rising edge of the global counter clock.

Figure 3B:
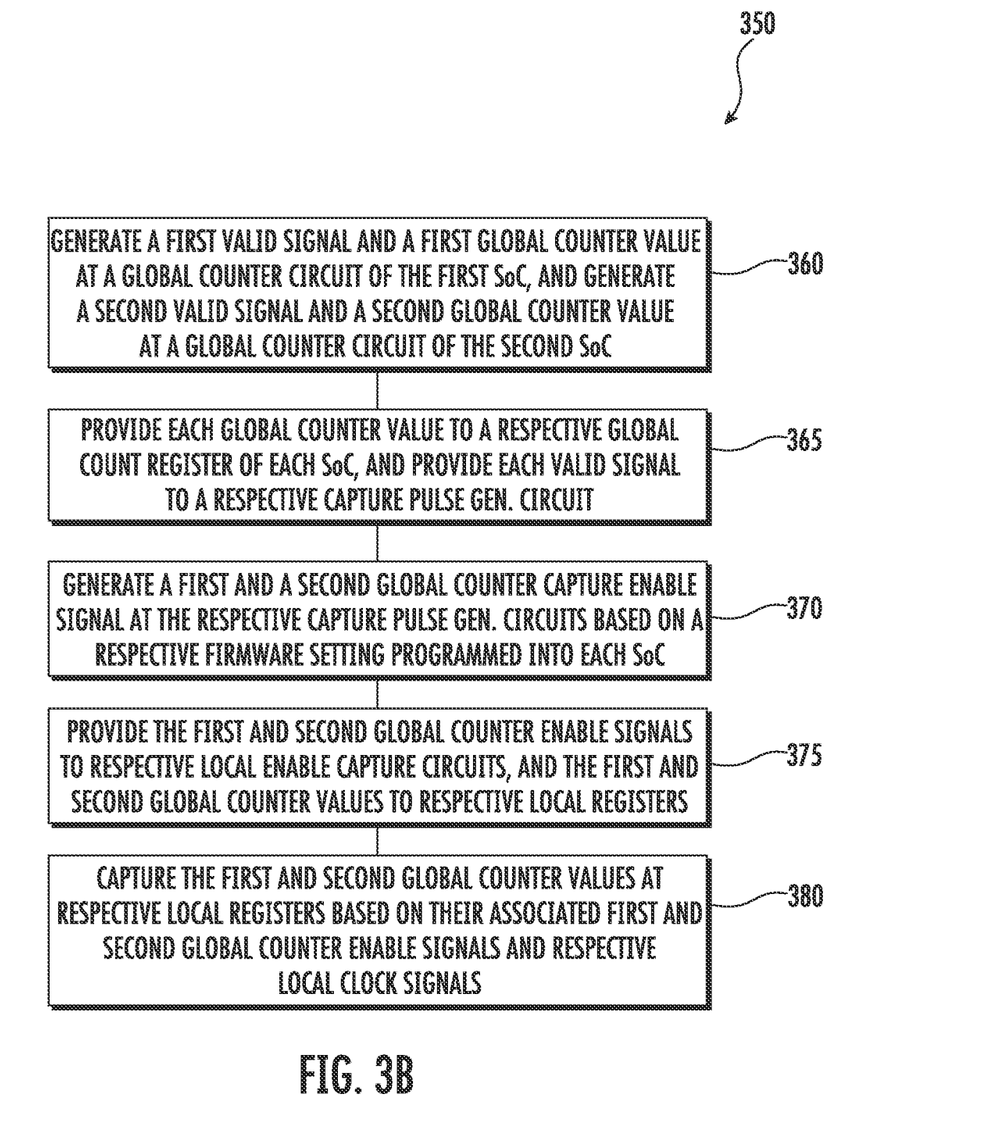
FIG. 3B is a block diagram of a method of distributing the global counter value within a single SoC of the multi-socket complex according to one aspect.

FIG. 3B is a block diagram of a method 350 of distributing the global counter value within a single SoC of the multi-socket complex according to one aspect. The method begins at block 360 by generating a first valid signal and a first global counter value at a global counter circuit of the first SoC, and a second valid signal and a second global counter value at a global counter circuit of the second SoC. For example, as described with respect to FIG. 2, each of the first socket SoC 110 and the second socket SoC 115 may include the global counter generation circuit 220, which includes a counter 220a storing a value which may be provided as a global counter value 222, which may be reset to a programmed initial value by a counter reset circuit 220b in response to the global counter reset signal 132, and which may be updated in response to a characteristic of the global counter clock 145. The global counter generation circuit 220 further includes a valid signal circuit 220c, which generates a valid signal 224.

The method continues in block 365 by providing each global counter value to a respective global count register of each SoC, and providing each valid signal to a respective capture pulse generation circuit. For example, as described with respect to FIG. 2, for each of the first SoC and the second SoC, their respective global counter register 232 may capture the global counter value 222, and their respective capture pulse generation circuit 234 receives the valid signal 224.

The method continues in block 370 by generating a first and a second global counter capture enable signal at the respective capture pulse generation circuits based on a respective firmware setting programmed into each SoC. For example, as described with respect to FIG. 2, for each SoC, their respective capture pulse generation circuit 234 receives the valid signal 224 and the first local clock signal 236, and generates a capture pulse 239, the characteristics of which may be controlled in part by SoC firmware 290.

The method continues in block 375, by providing the first and second global counter enable signals to respective local enable capture circuits, and providing the first and second global counter values to respective local registers. For example, as described with respect to FIG. 2, for each SoC, their respective registered global counter value 238 and the capture pulse 239 are provided to a local global counter register 242 and a local enable capture circuit 244 of a local portion 240 of the SoC 210.

The method continues in block 380, by capturing the first and second global counter values at respective local registers based on their associated first and second global counter enable signals and respective local clock signals. For example, as described with respect to FIG. 2, for each SoC, their respective local global counter register 242 and the local enable capture circuit 244 may be responsive to a second local clock signal 246 (which in some aspects may be the same as the first local clock signal 236, while in other aspects may be distinct from the first local clock signal 236). The local enable capture circuit 244 may perform synchronization and edge detection of the capture pulse 239, and may generate and provide a derived capture pulse 248 to the local global counter register 242, which may capture the registered global counter value 238 based on the second local clock signal 246 and the derived capture pulse 248.

The exemplary system for distributing a global counter value to multiple SoCs occupying multiple sockets of a multi-socket complex may, according to aspects disclosed herein and discussed with reference to FIGS. 1-3B, be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure. Further, certain aspects may described as "means for" performing various functions. For example, the first socket SoC 110 and the second socket SoC 115 may be referred to as "means for processing," which may further include other types of system-on-chip to which a signal such as a global counter value may be distributed in a multi-socket complex. A socket or any similar device for placing an integrated circuit on a motherboard or other platform may be referred to as "means for mounting."

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An apparatus, comprising:
a first system-on-chip (SoC) in a first socket;
a second SoC in a second socket;
a reset circuit coupled to the first SoC and the second SoC;
a reset synchronization circuit coupled to the reset circuit, the first SoC, and the second SoC; and
a global counter clock signal coupled to the reset synchronization circuit, the first SoC, and the second SoC;
wherein the reset synchronization circuit is configured to generate a global counter reset signal in response to a reset signal received from the reset circuit and to distribute the global counter reset signal to the first SoC and the second SoC simultaneously.

2. The apparatus of claim 1, wherein the global counter reset signal is distributed to the first SoC along a first path and to the second SoC along a second path, and wherein a skew between the arrival times of the global counter reset signal to the first SoC along the first path and to the second SoC along the second path are less than 5% of a clock period of the global counter clock signal.

3. The apparatus of claim 1, wherein the global counter reset signal may be asserted asynchronously and deasserted synchronously with the global counter clock signal.

4. The apparatus of claim 1, further comprising:
a first global counter generation circuit in the first SoC tracking a first SoC global counter value; and
a second global counter generation circuit in the second SoC tracking a second SoC global counter value;
each of the first and second global counter generation circuits configured to set their associated first SoC and second SoC global counter values to a programmed initial value based on the global counter reset signal being asserted.

5. The apparatus of claim 4, wherein each of the first and second global counter generation circuits are configured to increment their associated first SoC and second SoC global counter values by a programmed increment value based on a characteristic of the global counter clock signal.

6. The apparatus of claim 5, wherein each of the first and second global counter generation circuits are configured to generate an associated first SoC and second SoC global count valid signal that is asserted whenever their associated first SoC and second SoC global counter value has been updated and is available for intra-socket distribution.

7. The apparatus of claim 6, further comprising:
a first global counter distribution circuit in the first SoC including a first global counter register and a first capture pulse generation circuit, the first capture pulse generation circuit configured to be programmed by first firmware associated with the first SoC to generate a first global counter register valid pulse, and to generate a first capture pulse in part based on the programming by the first firmware; and
a second global counter distribution circuit in the second SoC including a second global counter register and a second capture pulse generation circuit, the second capture pulse generation circuit configured to be programmed by second firmware associated with the second SoC to generate a second global counter register valid pulse, and to generate a second capture pulse in part based on the programming by the second firmware;
wherein each of the first and second global counter registers are configured to capture the associated first SoC and second SoC global counter values received from the first and second global counter generation circuits based on the associated first and second global counter register valid pulses and to provide respective first and second registered global counter values.

8. The apparatus of claim 7, wherein generating the first and second capture pulses in part based on the programming by the first and second firmware comprises controlling a width or a delay of the respective first and second capture pulses.

9. The apparatus of claim 7, further comprising:
a first local portion in the first SoC including a first local global counter register configured to receive the first registered global counter value and a first local enable capture circuit configured to receive the first capture pulse; and
a second local portion in the second SoC including a second local global counter register configured to receive the second registered global counter value and a second local enable capture circuit configured to receive the second capture pulse;
wherein each of the first and second local enable circuits are configured to generate respective first and second derived capture pulses;
and wherein each of the first and second local global counter registers are configured to capture their respective first and second registered global counter values based on their respective first and second derived capture pulses.

10. The apparatus of claim 9, wherein the first global counter distribution circuit in the first SoC and the first local portion in the first SoC are in different frequency or voltage domains, and wherein the second global counter distribution circuit in the second SoC and the second local portion in the second SoC are in different frequency or voltage domains.

11. The apparatus of claim 1, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

12. An apparatus, comprising:
first means for processing in a first means for mounting;
second means for processing in a second means for mounting;
means for resetting coupled to the first means for processing and the second means for processing;
means for reset synchronization coupled to the means for resetting, the first means for processing, and the second means for processing; and
means for global counter clocking coupled to the means for reset synchronization, the first means for processing, and the second means for processing;
wherein the means for reset synchronization is configured to generate a global counter reset signal in response to a reset signal received from the means for resetting and to distribute the global counter reset signal to the first means for processing and the second means for processing simultaneously.

13. A method, comprising:
receiving a system reset at a first SoC in a first socket, a second SoC in a second socket, and a reset synchronization circuit;
generating a global counter reset signal at the reset synchronization circuit; and
providing the global counter reset signal to the first SoC in the first socket and the second SoC in the second socket simultaneously.

14. The method of claim 13, further comprising setting a first global counter value of the first SoC and a second global counter value of a second SoC to a programmed initial value based on the global counter reset signal being asserted.

15. The method of claim 14, further comprising updating the first and second global counter values based on a characteristic of a common global counter clock in response to receiving the common global counter clock and the global counter reset signal being deasserted.

16. The method of claim 15, wherein updating the first and second global counter values comprises incrementing the first and second global counters by a programmed increment value.

17. The method of claim 16, further comprising generating a first valid signal of the first SoC and a second valid signal of the second SoC, and providing the first and second global counter values to respective first and second global count registers of the first and second SoCs, and the first and second valid signals to respective first and second capture pulse generation circuits of the first and second SoCs.

18. The method of claim 17, further comprising:
generating first and second global counter register valid pulses by the respective first and second capture pulse generation circuits;
generating first and second capture pulses by the respective first and second capture pulse generation circuits based on respective first and second firmware programming associated with the respective first and second capture pulse generation circuits; and
capturing the first and second global counter values at the respective first and second global count registers based on the respective first and second global counter register valid pulses to generate first and second registered global counter values.

19. The method of claim 18, wherein the first and second firmware programming controls a pulse width or a delay of the respective first and second capture pulses.

20. The method of claim 19, further comprising:
receiving the first registered global counter value at a first local global count register of a first local portion of the first SoC;
receiving the second registered global counter value at a second local global count register of a second local portion of the second SoC;
receiving the first capture pulse at a first local enable capture circuit of the first SoC;
receiving the second capture pulse at a second local enable capture circuit of the second SoC;
generating respective first and second derived capture pulses by the respective first and second local enable capture circuits; and
capturing the first and second registered global counter values at their respective first and second local global count registers in response to their respective first and second derived capture pulses.

* * * * *